United States Patent

[11] 3,618,077

[72] Inventor Herbert L. Peterson
Hillcrest Heights, Md.
[21] Appl. No. 58,012
[22] Filed July 24, 1970
[45] Patented Nov. 2, 1971
[73] Assignee The United States of America as represented by the Secretary of the Navy

[54] WALSH FUNCTION GENERATOR
8 Claims, 5 Drawing Figs.

[52] U.S. Cl. .......... 340/348, 178/68, 179/15 BC
[51] Int. Cl. .......... G08c 9/00
[50] Field of Search .......... 179/15 BC; 178/68; 325/38, 141; 343/203; 235/150.53; 340/348, 351

[56] References Cited

UNITED STATES PATENTS 3,204,035 8/1965 Ballard et al. .......... 178/68
3,384,715 5/1968 Higuchi et al. .......... 179/15

OTHER REFERENCES

Harmuth, " A Generalized Concept of Frequency and Some Applications," IEEE Trans. on Info. They., Vol. IF- 14, No. 3., PP. 375- 382, May, 1968.

*Primary Examiner*—Robert L. Griffin
*Assistant Examiner*—James A. Brodsky
*Attorneys*—R. S. Sciascia, Arthur L. Branning and James G. Murray ABSTRACT: A clock-driven generator which produces desired Walsh functions in response to binary number input command signals. These binary number input signals are modified to allow forward copying about the axes of symmetry of the Walsh functions as localized in a shift register, the serial output of which is the desired Walsh functions. Forward copying is accomplished by circuitry that includes half adders connected between the modified binary number input signals and the axes of symmetry of the shift registers and is controlled by a clock driven counter acting through AND gating circuitry.

| DECIMAL | BINARY A | B | C | D |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |
| 11 | 1 | 0 | 1 | 1 |
| 12 | 1 | 1 | 0 | 0 |
| 13 | 1 | 1 | 0 | 1 |
| 14 | 1 | 1 | 1 | 0 |
| 15 | 1 | 1 | 1 | 1 |

INVENTOR

HERBERT L. PETERSON

BY James G. Murray
Arthur G. Lassiter
ATTORNEYS

INVENTOR

HERBERT L. PETERSON

BY James G. Murray [signature]

ATTORNEYS

| INPUTS | | OUTPUT |
|---|---|---|
| 0 | 0 | 0 |
| 0 | 1 | 1 |
| 1 | 0 | 1 |
| 1 | 1 | 0 |

HALF ADDER "TRUTH TABLE"

INVENTOR
HERBERT L. PETERSON
BY James G. Murray
Arthur J. [illegible] ATTORNEYS

FIG. 5

TIME HISTORY OF REGISTER 14 FOR COMMAND SIGNAL INPUT OF 12

| BIT | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| START | 1 | 0 | 0 | 0 | 0 | 0 | 0 | 0 | 0 | 0 | 0 | 0 | 0 | 0 | 0 | 0 |
| CLOCK PULSE | | | | | | | | | | | | | | | | |
| 1 | 0 | 1 | 0 | 0 | 0 | 0 | 0 | 0 | 0 | 0 | 0 | 0 | 0 | 0 | 0 | 0 |
| 2 | 1 | 0 | 1 | 0 | 0 | 0 | 0 | 0 | 0 | 0 | 0 | 0 | 0 | 0 | 0 | 0 |
| 3 | 0 | 1 | 0 | 1 | 0 | 0 | 0 | 0 | 0 | 0 | 0 | 0 | 0 | 0 | 0 | 0 |
| 4 | 0 | 0 | 1 | 0 | 1 | 0 | 0 | 0 | 0 | 0 | 0 | 0 | 0 | 0 | 0 | 0 |
| 5 | 1 | 0 | 0 | 1 | 0 | 1 | 0 | 0 | 0 | 0 | 0 | 0 | 0 | 0 | 0 | 0 |
| 6 | 0 | 1 | 0 | 0 | 1 | 0 | 1 | 0 | 0 | 0 | 0 | 0 | 0 | 0 | 0 | 0 |
| 7 | 1 | 0 | 1 | 0 | 0 | 1 | 0 | 1 | 0 | 0 | 0 | 0 | 0 | 0 | 0 | 0 |
| 8 | 1 | 1 | 0 | 1 | 0 | 0 | 1 | 0 | 1 | 0 | 0 | 0 | 0 | 0 | 0 | 0 |
| 9 | 0 | 1 | 1 | 0 | 1 | 0 | 0 | 1 | 0 | 1 | 0 | 0 | 0 | 0 | 0 | 0 |
| 10 | 1 | 0 | 1 | 1 | 0 | 1 | 0 | 0 | 1 | 0 | 1 | 0 | 0 | 0 | 0 | 0 |
| 11 | 0 | 1 | 0 | 1 | 1 | 0 | 1 | 0 | 0 | 1 | 0 | 1 | 0 | 0 | 0 | 0 |
| 12 | 0 | 0 | 1 | 0 | 1 | 1 | 0 | 1 | 0 | 0 | 1 | 0 | 1 | 0 | 0 | 0 |
| 13 | 1 | 0 | 0 | 1 | 0 | 1 | 1 | 0 | 1 | 0 | 0 | 1 | 0 | 1 | 0 | 0 |
| 14 | 0 | 1 | 0 | 0 | 1 | 0 | 1 | 1 | 0 | 1 | 0 | 0 | 1 | 0 | 1 | 0 |
| 15 | 1 | 0 | 1 | 0 | 0 | 1 | 0 | 1 | 1 | 0 | 1 | 0 | 0 | 1 | 0 | 1 |
| 16 | 1 | | | | | | | | | | | | | | | |

Wal (12)

☐ OTHER HALF ADDER INPUT = 1

⬚ OTHER HALF ADDER INPUT = 0

INVENTOR
HERBERT L. PETERSON
BY James D. Murray
[signature]
ATTORNEYS

WALSH FUNCTION GENERATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Although Walsh functions have been known since 1923 when they were described by J. L. Walsh in pgs. 5–24 of Vol. 45 of The American Journal of Mathematics, the use of these functions has, until recently, been somewhat limited. In the past several years however, and perhaps as a result of the emergence of extremely fast-switching, two-state hardware, a tremendous increase in the use and applications research of Walsh functions has become evident. Walsh functions can be effectively utilized for signal processing and multiplexing to accomplish such tasks as signal detection or enhancement in the presence of noise, signal sorting, and signal parameter identification. Other applications result in better utilization of digital computers and more efficient processing of pulse signals. Further applications are clearly foreseen in the areas of radar, sonar, telemetry, coding and cryptography, pattern recognition, and biomedical signal processing.

Concurrent with the increased use and interest in Walsh functions has been a rising demand for generators which reliably produce a spectrum of Walsh functions on demand over a wide range of speeds.

Prior attempts to generate Walsh functions have, in general, been by the method of synthesizing a desired Walsh function from Walsh functions of lower order. This technique disadvantageously requires the use of a large computer memory and complex combining circuitry.

SUMMARY OF THE INVENTION

This invention provides a generator which requires minimal storage and combining circuitry and which rapidly produces desired Walsh functions in response to binary number input command signals. To attain this goal, the invention includes circuitry which modifies the binary number input signals to allow forward copying about the axes of symmetry of the Walsh functions as localized in a shift register, the serial output of which is the desired Walsh functions. According to the invention, forward copying is accomplished by circuitry that includes half adders connected between the modified binary number input signals and the axes of symmetry that are localized in the shift register and is controlled by a clock-driven counter acting through AND gating circuitry. The invention can be made to produce Walsh functions in an extremely fast rate since all components are in a state of the art status that permits the use of a very high-frequency clock.

OBJECTS OF THE INVENTION

An object of the invention is, therefore, to provide an improved Walsh function generator.

Another object of the invention is the provision of an improved Walsh function generator which requires minimal storage and combining circuitry and which rapidly produces desired Walsh functions in response to binary number input command signals.

A still further object of the invention is the provision of an improved Walsh function generator which is clock driven and rapidly produces desired Walsh functions by modifying binary number input command signals in a way which allows forward copying about axes of symmetry of the Walsh functions as localized in a shift register, the serial output of which is the desired Walsh functions.

DESCRIPTION OF THE DRAWINGS

Other objects and advantages of the invention will hereinafter become more fully apparent from the following description of the annexed drawings, which illustrate a preferred embodiment, and wherein:

FIGS. 3, 4, and 5 are diagrams which are useful in understanding the invention.

DESCRIPTION OF THE PREFERRED EMBODIMENT

Figure 1:
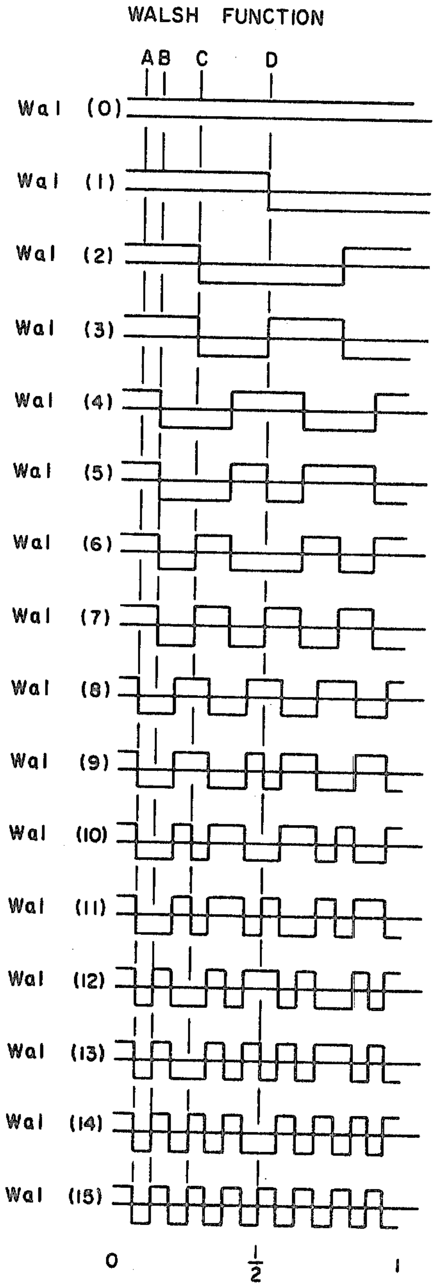
FIG. 1 shows the first 16 Walsh functions.

The reader'attention is first directed to FIG. 1 which shows from left to right, the decimal numbers 0–15, the binary numbers 0000–1111 and the first 16 Walsh functions, i.e. wal(0)–wal(15). It will be noted that for each Walsh function, wal($n$), the plot of the function crosses the zero axis $n$ times in the period 0 to 1 for which the Walsh functions are orthogonally defined. This, of course, is the basis for the commonly used units for measuring a Walsh function, i.e. the sequency (analogous to 2 ×frequency) as defined in zero crossings per second, zps, (analogous to 2 ×c.p.s.).

It is of vastly more interest to the present invention, however, to note the property of the Walsh functions whereby the binary number of the function defines the symmetry of the function wal($n$) about the axes A, B, C, and D. For a "1" in the binary code the symmetry is conjugate about the appropriate axis and for "0" pure symmetry exists about the appropriate axis. Consider, for example, the binary number 12, i.e., 1100 and note that wal(12) is conjugately symmetric about the axes A and B and purely symmetric about the axes C and D.

Figure 2:
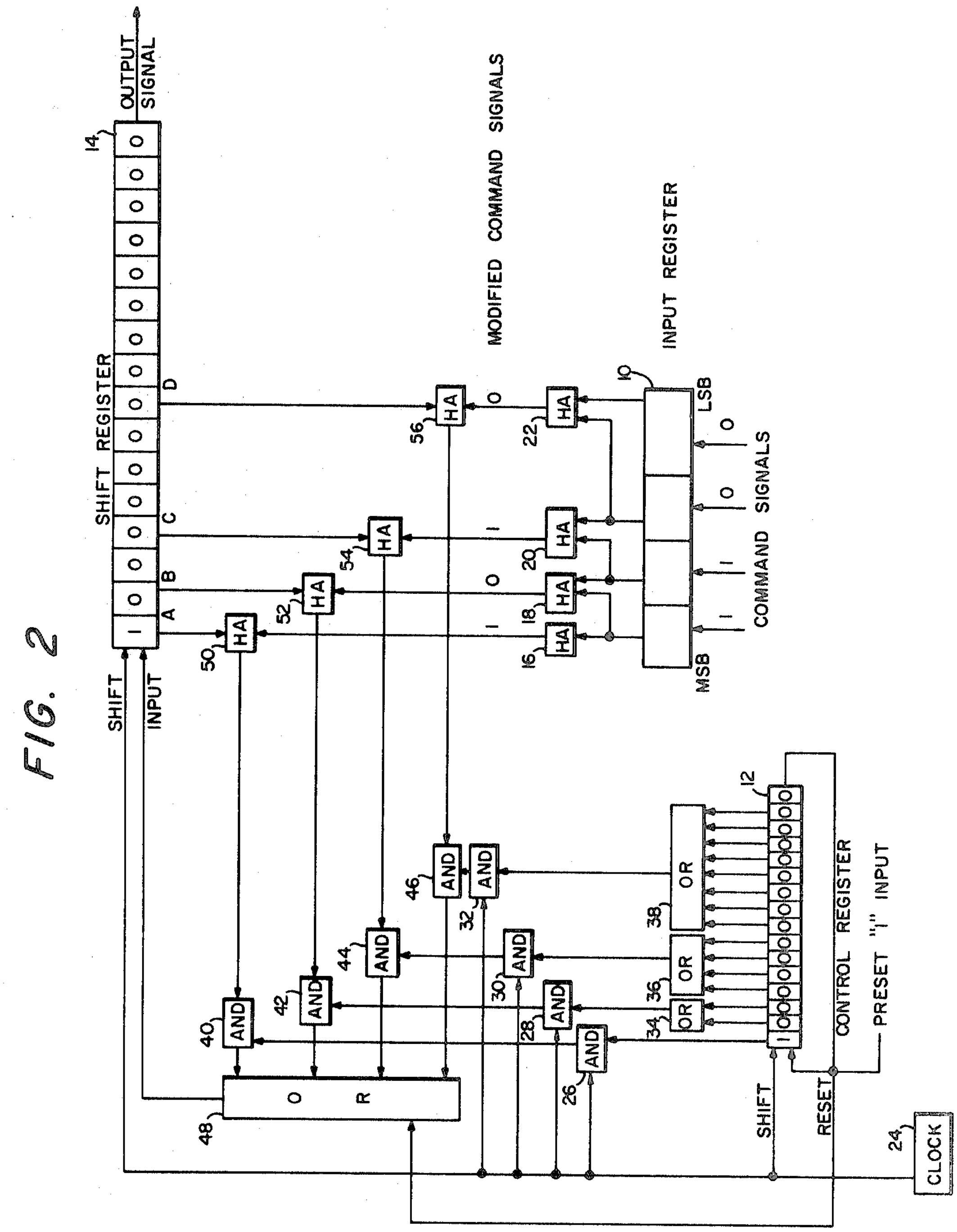
FIG. 2 illustrates the invention in block diagram form.

Consistent with the showing of the first 16 Walsh functions in FIG. 1, the preferred embodiment of the invention, shown in FIG. 2, is capable of accepting only four-bit binary input command signals through the input register 10. However, it will be apparent to the reader that much greater capabilities could, and would, be designed into a practical system and that the four-bit input register 10, and the associated discussion and generation of only the first 16 Walsh functions, are limitations used only for the purpose of making the description and drawings less cumbersome. The reader should not assume any implication that input registers of more than four bits are not feasible or within the scope of the invention.

To the contrary, the input register 10 may have any large number N of bits, in which even the control register 12 will have $2^N$ bits and the readout shift register 14 will have at least $2^N/2$ (or $2^{N-1}$) bits. It may be found desirable to have the register 14 contain $2^N$ bits as shown in FIG. 2. The invention is, in general, capable of producing $2^N$ Walsh functions, which by inherent properties, have N axes of symmetry.

As will be more apparent later, the symmetrical properties of the Walsh functions about predetermined axes is a fundamental basis of the operation of the present invention. While computers of considerable complexity have been designed to produce Walsh functions by reading back from the axes of symmetry and copying in a forward direction, the present invention contemplates the much simpler apparatus of a forward-moving shift register (register 14 in FIG. 2) to produce the desired Walsh functions. It is, therefore, a necessary feature of the present invention to include circuitry (the half (adders [HA] 16, 18, 20, and 22 of FIGS. 2 and 4) which modifies the input command signals so that both the reading and the copying can be done in the forward direction of the shift register operation.

Figures 3, 4:
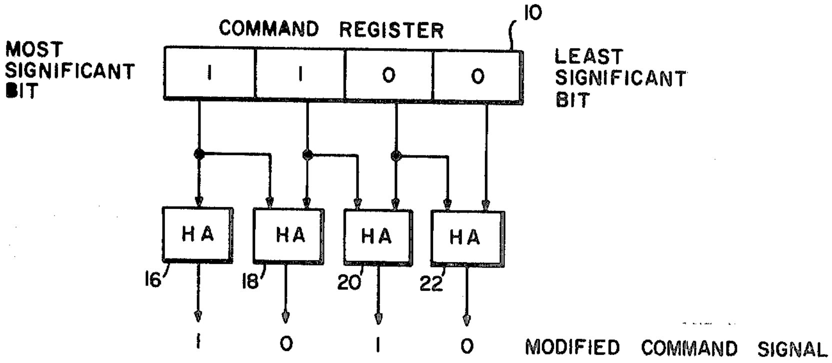

FIG. 3 shows the "truth table" or input-output relationship for a half adder [HA] or exclusive-OR circuit. When both inputs are either "1" or "0," i.e. both inputs are in the high-voltage state of both inputs are at the low-voltage level, the output is "0" and when only one of the inputs is at the "1" level, so is the output.

The portion of the invention which modifies the input command signals to allow for the forward operation of the shift register 14 is shown in greater detail in FIG. 4. For purposes of discussion, and as shown in the input register 10, the binary command signal will be assumed to be 1100 (12) which is, of course, a command to produce the 13th Walsh function, wal(12). The least significant bit of register 10, a signal "0," is connected to the half adder 22; the next bit of register 10 being connected to half adders 20 and 22; the next bit of register 10, a signal "1," is connected to the half adders 18 and 20 and the most significant bit of register 10, signal "1," is connected to the half adders 16 and 18. The outputs of half adders 16, 18, 20, and 22, governed by the "truth table" of FIG. 3, constitute the modified command signal 1010 which is connected to cooperate with signals from the symmetrical axes A, B, C, and D localized in shift register 14, to produce the desired Walsh function. The modified binary signal (1010) output in FIG. 4 is also called a reflected binary signal.

Referring now to FIG. 2, which illustrates a preferred embodiment of the invention in block diagram form, the input register 10 is shown connected to receive binary command signals from a source, such as a computer, which need not be specified but which must, of course, be properly synchronized with the shift generator or clock 24 to change at times appropriate to the production of complete Walsh functions. Since all of the components of the invention are capable of quick acting, by current state of the art designs, the clock 24 can be extremely high frequency, thereby causing the invention to produce thousands of Walsh functions per second.

The shift generator or clock 24 is connected to drive the control register 12 which has a "traveling 1," is self resetting and includes $2^4$=16 bits. Clock 24 is also connected to the "Shift" input of the readout shift register 14 (which is shown as containing $2^N$ bits but which could obviously use only $2^N/2$ bits, the output being taken at the D axis or eighth bit) and to the interrogate AND-type gates 26, 28, 30, and 32 which cooperatively function, either directly or through the OR gates 34, 36, and 38, with the "traveling 1" in control register 12 to sequentially open AND-gates 40, 42, 44 and 46, respectively, for one, two, four and eight pulses of the clock 24. When opened, gates 40, 42, 44, and 46 respectively pass to OR-gate 48 the outputs of half adders 50, 52, 54 and 56 which, in turn, respectively have one input connected to the outputs of half adders 16, 18, 20, and 22 and to the other input connected to the first, second, fourth, and eighth bit of shift register 14. The output of OR-gate 48 is connected to the first, or write-in, bit of the shift register 14. OR-gate 48 is also connected to receive the resetting pulse of control register 12 which presets a "1" into the first bit of register 14.

FIGS. 4 and 5 may be useful in understanding the operation of the preferred embodiment of the invention illustrated in FIG. 2. For purposes of discussion, it will be assumed that the desired Walsh function ordered by the input command signals to register 10 is wal(12), i.e. the input signal is 1100. As explained in connection with FIG. 4, the circuitry associated with the half adders 16, 18, 20, and 22 modifies the input command signal to become the reflected binary signal 1010. This modified binary command signal (1010) is applied as inputs to the half adders 50, 52, 54, and 56, the other inputs of which are connected to the first, second, fourth, and eighth bits of output shift register 14 and thereby serve to localize the Walsh function symmetrical axes, A, B, C, and D (FIG. 1) in the shift register 14. The outputs of the half adders 50, 52, 54, and 56 are selectively loaded into the shift register 14 through OR-gate 48 and the AND-gates 40, 42, 44, and 46 which are substantially opened for one, two, four and eight pulses of the clock 24 by the AND-gates 26, 28, 30 and 32 that are controlled, either directly or through the OR-gate 34, 36, and 38, by the "traveling 1" in control register 12. The operation of the entire generator is, of course, synchronized by the pulses from clock 24, at what may be an extremely fast rate. In a practical generator, the use of signal delay devices (not shown) in the input lines of the registers 12 and 14 may be desirable to allow register 14 to shift before being loaded.

FIG. 5 shows how the condition of readout shift register 14 changes, pulse by pulse, when wal(12) is commanded by a 1100 input signal to the register 10. Often, this command signal will come from a computer in another part of a large system. As shown in FIG. 5, this signal is modified to 1010 by the half adder circuits 16, 18, 20, and 22 so that the output of the first bit of the shift register 14, i.e. the axis of symmetry A, is added in half adder 50 with the "1" output of half adder 16. This is symbolically shown in FIG. 5 by the full line box.

At the start, the "traveling 1" is in the first-bit position of control register 12 and, with a pulse from clock 24, causes AND-gate 26 to open AND-gate 40 to pass the output of half adder 50 to the OR-gate 48 for loading into the shift register 14 as that register shifts. Since the output of half adder 16 is 1 and since shift register 14 is preset with a 1, as is the register 12, the output of half adder 50 is a zero, which signal is loaded into shift register 14 as the preset 1 is shifted to the second bit position of shift register 14.

For the next two pulses of clock 24, the "traveling 1" in shift register 12 acts through OR-gate 34 and AND-gate 28 to open AND-gate 42 to pass the output of half adder 52 to OR-gate 48 for loading into shift register 14. As shown by the dashed box in FIG. 5, for these two pulses the output of the second bit of shift register 14, i.e. the B axis of symmetry, is added with a zero output of half adder 18.

Similarly, for the next four and eight pulses of clock 24, the "traveling 1" in shift register 12 causes AND-gates 44 and 46 to respectively load the output of half adder 54 (i.e. the axis of symmetry C as localized in the fourth bit of shift register 14 and added to the "1" output of half adder 20 and shown in FIG. 5 by the full line box) and the output of half adder 56 (i.e. the axis of symmetry D) into the shift register 14. After 15 pulses, the readout shift register 14 will have wal(12) stored and ready to become the output signal during the next 16 pulses, the first of which resets the "traveling 1" into the first bit position of control register 12 and, through the OR-gate 48, into the first bit of register 14. The reader will find, for the most part, the continued operation of the apparatus of FIG. 2 to be obvious.

It should be noted that most significant bit adder 16 shows only one input. The other input has zero level voltage applied at all times and therefore has not been shown. The reason for the zero level voltage constant input is because the output signal is desired to be exactly the same as that being fed to the half adder 16 from the input register.

It is considered to be desirable to mention several innovations which may be made to the output shift register 14. One such innovation would be to eliminate the right half of register 14 and take a serial output from any one of the remaining eight bits, preferably the leftmost bit since this will reduce the processing time. Another innovation would be to retain the 16 bits of shift register 14, as illustrated, but make the readout in parallel, in which event the output signal would be the desired Walsh function in reverse order.

There has been disclosed an improved Walsh function generator which is clock driven and rapidly produces desired Walsh functions by modifying binary number input command signals in a way which allows copying about axes of symmetry of the Walsh function as localized in a shift register, the serial output of which is the desired Walsh functions.

Obviously many modifications and variations of the present invention are possible in the light of the above teachings. It is therefore to be understood, that within the scope of the appended claims, the invention may be practiced otherwise than as specifically described.

What is claimed and desired to be secured by letters patent of The United States is:

1. A Walsh function generator comprising:

input register means for accepting an N-bit binary command signal representative of a desired Walsh function;

shift register means having at least $2^N$2 bits, the first of which is the input to said shift register means and the last of which is the output of said Walsh function generator;

pulsing means for producing pulses and connected to said first bit of said shift register means for driving said shift register means;

copying means connected to said input register means and to said $2^1/2$, $2^2/2$,...$2^N/2$ bits of said shift register means for producing a series of N signals that are related by a known relationship to said N-bit binary command signal and to signals which are in said $2^1/2$, $2^2/2$,...$2^N/2$ bits of said shift register means and gating means connected to be driven by said pulsing means for sequentially connecting for predetermined numbers of pulses, said series of N signals to said first bit of shift register means.

2. The Walsh function generator of claim 1 wherein said copying means includes N half adders and said known relationship is based upon the half adder "truth table."

3. The Walsh function generator of claim 2 wherein said gating means includes a $2^N$-bit shift register with means for self-resetting, said shift register containing a "traveling 1" signal and connected to be driven by said pushing means.

4. The Walsh function generator of claim 3 wherein said gating means further includes a first group of N AND gates which are each connected to said pulsing means and either directly or through a group of N-1 OR gates to said $2^N$-bit shift register.

5. The Walsh function generator of claim 4 wherein said gating means further includes a second group of N AND gates, each of which are connected to a different one of said first group of N AND gates and to a different one of said series of N signals and to said first bit of said shift register means.

6. A Walsh function generator comprising:

a shift register having at least $2^N/2$ bits and receiving an input at the first bit and producing a Walsh function output at said at least $2^N/2$th bit;

a first group of N half adders with one half adder connected to each of the $2^N/2^N$, $2^N/2^{N1}$... $2^N/2^1$th bits of said shift register;

input register means having N bits for receiving an N-bit binary command signal;

a second group of N half adders connected individually to a different one of said first group of N adders and to a different one of said N bits of said input register means and gating means for individually and sequentially connecting, for predetermined periods of time, the half adders of said first group to the first bit of said shift register.

7. The Walsh function generator of claim 6 wherein said gating means comprises:

clock means for producing pulses which drive said Walsh function generator;

a first group of N AND gates connected individually to the outputs of said first group of N half adders;

control shift register means having $2^N$ bits, with means for self-resetting, said shift register means containing a "-traveling 1" and connected to be driven by said clock means;

a second group of N AND gates having outputs which are individually connected to said first group of N AND gates and inputs which are connected to said clock means and which are individually connected either directly or through a group of N-1 OR gates to said control shift register and and OR gate having inputs connected to the outputs of said first group of N AND gates an to the self-resetting portion of said control shift register means and an output which is connected to the first bit of said shift register.

8. The method of producing Walsh function signals comprising the following steps:

continually driving a multistage shift register which produces a Walsh function output signal and is connected to provide readouts at the axes of symmetry of Walsh functions corresponding to appropriate preselected stages of said shift register;

producing a binary number signal of the desired Walsh function;

modifying said binary number signal to become a reflected binary signal;

adding said reflected binary signal to the axes of symmetry readouts from said shift register according to the half adder "truth table" and using the result of said adding as the input to said shift register according to a predetermined pattern.

* * * * *